Dec. 5, 1961 A. C. McCOY 3,011,643
SAND FILTER APPARATUS FOR SWIMMING POOLS
Filed March 23, 1959 2 Sheets-Sheet 1

INVENTOR.
ALVIN C. McCOY
BY
ATTORNEY

Dec. 5, 1961 A. C. McCOY 3,011,643
SAND FILTER APPARATUS FOR SWIMMING POOLS
Filed March 23, 1959 2 Sheets-Sheet 2
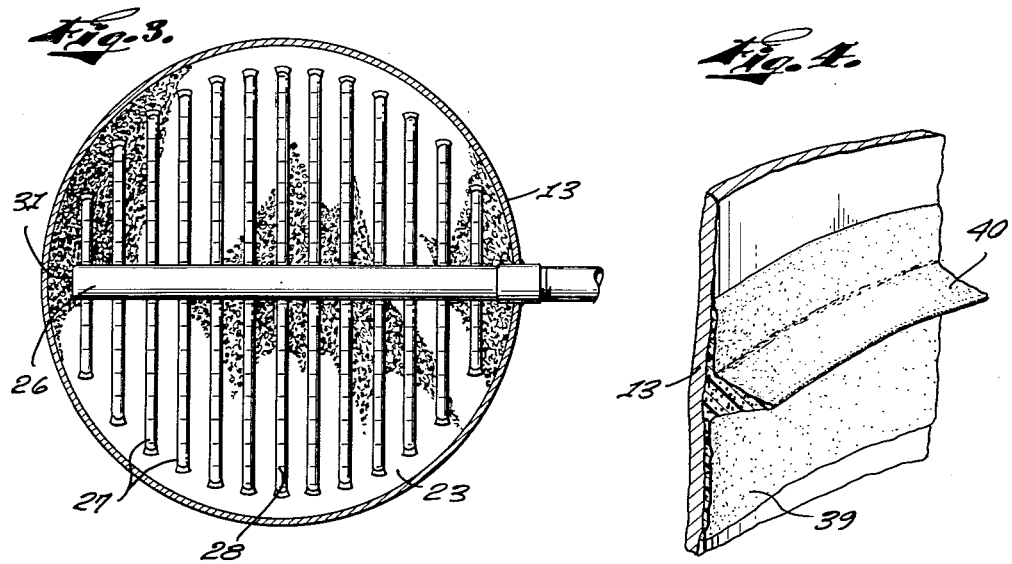
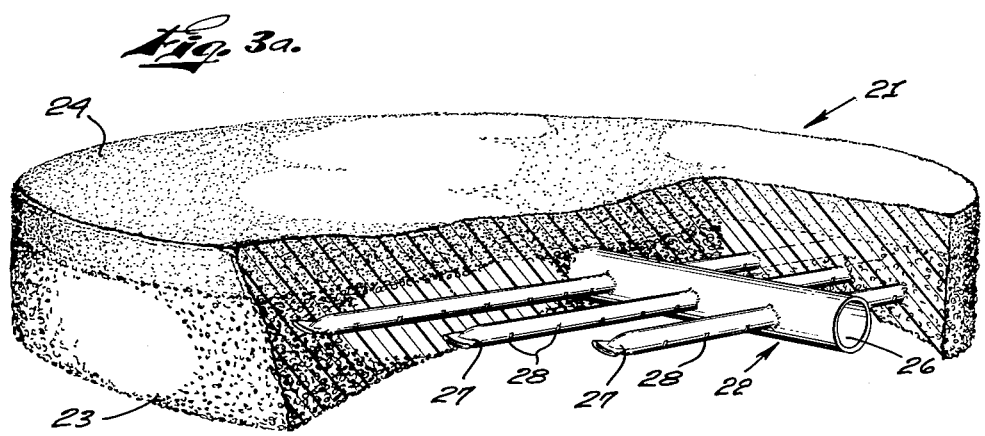
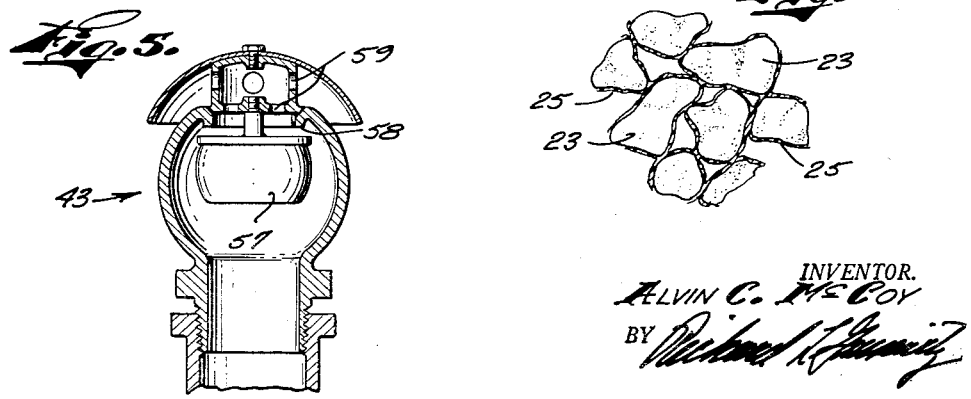
INVENTOR.
ALVIN C. McCOY
BY
ATTORNEY

United States Patent Office 3,011,643
Patented Dec. 5, 1961

3,011,643
SAND FILTER APPARATUS FOR SWIMMING
POOLS
Alvin C. McCoy, 2655 Valencia Ave.,
San Bernardino, Calif.
Filed Mar. 23, 1959, Ser. No. 801,317
7 Claims. (Cl. 210—169)

This invention relates to a sand filter apparatus and system for use in filtering the water for swimming pools and the like.

Conventional sand-bed filters, comprising numerous graded layers of loose sand and rock, provide an excellent filtering action and are readily cleaned of contaminants by merely backwashing or backflushing water upwardly through the beds. Such backwashing provides a highly-effective cleaning action since the finer filter material at the upper portion of each bed is lifted into the water where each particle may be cleaned on all sides. However, such beds are excessively bulky and expensive, particularly where the system is to be employed in connection with a family-size swimming pool or other relatively small equipment.

Because of the great bulk and expense of conventional sand-bed filters, it has become common practice to employ filters in which the swimming pool water is merely passed through a strainer or a bag of filter material. After the pores in the strainer become clogged with contaminants, it is partially cleaned or else thrown away, it being impractical or impossible to effect thorough cleaning. Such filter apparatus, furthermore, does not provide an effective filtering action.

It has also been proposed to provide cakes of filter material in which sand was bonded together in a suitable manner. Such cakes comprised the actual filtering medium, and were unsatisfactory since the bonded sand was not readily or satisfactorily cleaned of contaminants. One suggested solution to the problem of cleaning filter cakes was to break up the cakes, clean the sand and then re-combine the sand into cake form through use of a suitable adhesive. Such a suggested solution was, however, impractical and excessively expensive.

In view of the above factors characteristic of filter apparatus, it is an object of the present invention to provide an improved sand filter apparatus which is small and compact in size and economical to manufacture and use, yet which produces a highly-effective filtration operation.

A further object is to provide a small and compact sand filter apparatus in which loose particles are employed as the filtering medium, so that backwashing will effect a thorough and efficient cleaning of contaminants from the filter.

A futher object of the invention is to provide a combination filter base and underdrain header adapted to provide a uniform flow of water during the backwash cycle, and constructed as a rigid unit whereby the underdrain header may have minimum strength for economy of production.

A further object is to provide overdrain and underdrain constructions adapted to provide uniform flow of water through the filter apparatus, to thereby minimize channeling and eruption effects and reduce the required freeboard distance to a minimum.

A further object is to provide a filter apparatus incorporating novel means for preventing channeling of water down the sides of the sand bed, so that the water must pass through the sand itself.

A further object is to provide a plurality of small and compact filter units which may be used either singly or in multiple, in combination with conduit means adapted to effect selective flow of water to the filter units during backwashing so that a relatively small-capacity pump may be employed and still provide efficient cleaning of contaminants from each unit.

These and other objects and advantages of the invention will be set forth more fully in the following specification and claims, considered in connection with the attached drawings to which they relate.

In the drawings:

FIGURE 3 is a horizontal section taken on line 3—3 of FIGURE 1, and looking in an upward direction as indicated by the arrows;

FIGURE 3a is a perspective view of one of the unitary filter base and underdrain header assemblies, portions being broken away to illustrate the underdrain laterals independently of the surrounding rock medium;

FIGURE 4 is an enlarged fragmentary perspective view illustrating the means for preventing channeling of water down the sides of the filter sand bed;

FIGURE 5 is a vertical section showing an anti-siphon valve connected in the conduit means; and FIGURE 6 is an enlarged fragmentary section of a portion of the base unit.

Figure 1:
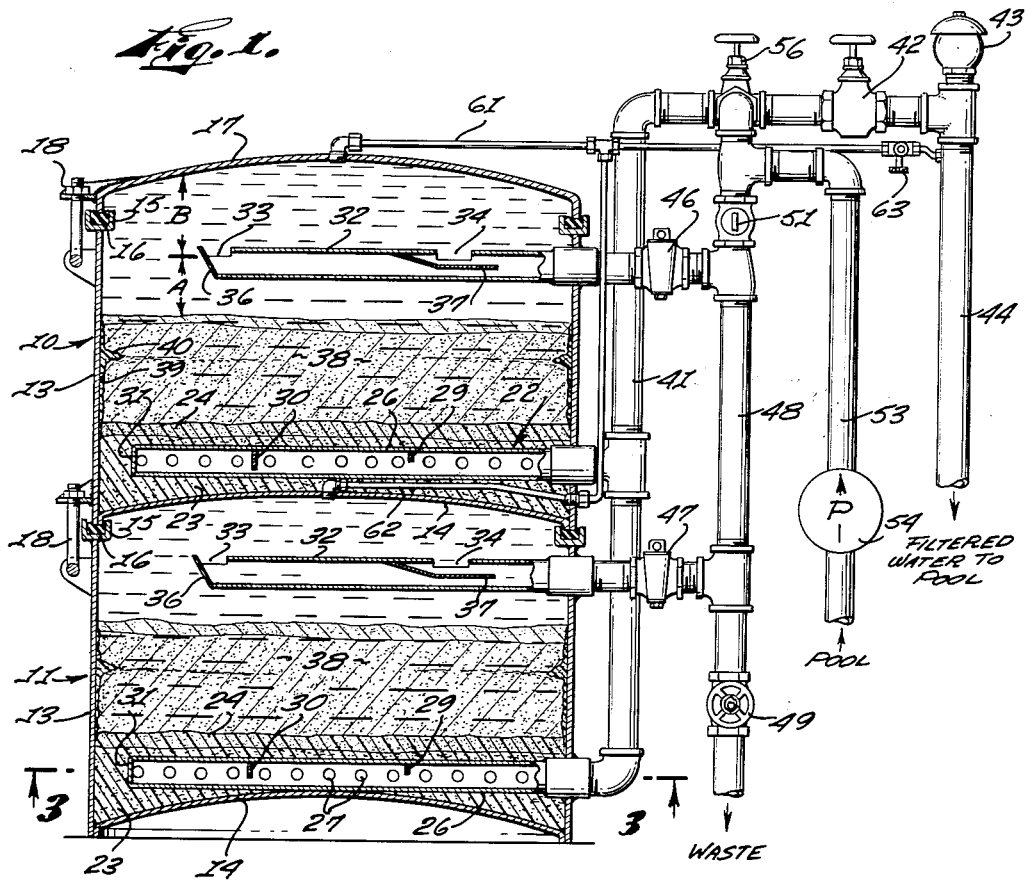
FIGURE 1 is a vertical central sectional view illustrating a two-unit filter apparatus constructed in accordance with the present invention, in combination with conduit and valve means for connecting the units in parallel during the filter cycle and independently during the backwash cycle.

The apparatus of the invention may comprise one or any number of independent filter units which may be small and compact, and which may be mounted in either stacked or laterally-spaced relationship. Two such units are shown in FIGURE 1 and are numbered 10 and 11. Except as may be specifically stated hereinafter, the units may be substantially identical. Accordingly, only one unit will be described in detail.

Each unit comprises a generally tubular metal wall 13 in one end of which is welded what may be termed the bottom member 14, although it is to be understood that such member also serves as the cover for the next lower unit. At the upper end of wall 13 is welded an annular seat member 15 having a channel-shaped cross section and containing a sealing means or substance 16. Seat member 15 is adapted to seat either the peripheral portions of wall 13 and the connected bottom member 14, as shown generally at the center of FIGURE 1, or else to seat the peripheral portion of a top cover 17 as shown at the upper part of FIGURE 1. Suitable swing-bolt connectors 18 are provided to maintain the elements in tightly-assembled relationship whereby adequate seals are provided at 16. The bottom members 14 and top cover 17 are preferably dome-shaped to facilitate removal of air from the system.

It is an important feature of the invention that the base or support for the loose filter sand comprises a rigidly-cast unit 21 (FIGURE 3a) incorporating bonded stones or gravel in which is embedded the underdrain header 22. Stated more specifically, the base unit may comprise a number of inches of relatively small-diameter gravel or stones, for example ¼ inch in diameter, and indicated at 23 in FIGURES 3a and 6. A thinner layer of smaller-diameter stones, for example ⅛ inch in diameter, is cast over the layer 23 and is indicated at 24 in FIGURE 3a. The stones in layers 23 and 24 are all bonded together, to form a disc, by coating each stone with a suitable adhesive substance 25 (FIGURE 6) and then casting the coated stones in the bottom of tubular element 13 over bottom member 14. It has been found that a thermosetting synthetic bonding resin, such as of the polyester or epoxy types, is highly satisfactory for this purpose. Such resins, which make use of suitable catalysts, are well known in the art of boat building, for example. It is emphasized that the resin does not fill the voids between the individual stones, but instead coats each stone in order to effect rigid bonding between all of the stones while maintaining the voids therebetween.

Underdrain header 22 comprises a relatively large-diameter tubular plastic pipe or manifold 26 from which a substantial number of smaller-diameter laterals 27 are projected to provide relatively uniform inflow of water into the coarser layer 23 of the base unit. Each lateral has a substantial number of outlet openings therein, indicated as the arcuate slots 28 which are provided in the undersides only of the laterals. In order to provide inflow of water to the laterals 27 at relatively uniform pressures and velocities, a plurality of baffles 29 and 30 are provided in pipe 26 as illustrated in FIGURE 1. Thus, the baffle 29 at the portion of the pipe relatively near the inlet end thereof is shown as being relatively small, occupying somewhat less than half the cross-sectional area of the pipe. Baffle 30, relatively adjacent the closed end 31 of pipe 26, is larger in area and occupies more than half of the cross-sectional area of the pipe. If it were not for the presence of the baffles 29 and 30, a much larger amount of water would flow through the laterals adjacent the closed end 31 than adjacent the inlet end of the pipe. It is pointed out that the plastic pipe 26 and laterals 27 may be relatively thin-walled and economical in construction, this being because they are supported by the rigidly-cast rock 23 in which they are embedded.

An overdrain header 32 is mounted horizontally in each unit and in spaced parallel relationship above the underdrain header 22 therein. Header 32 comprises a tubular plastic pipe having sufficiently large diameter to be self-supporting, so that it may be cantilevered from one portion of wall 13. The header pipe 32 has a plurality of arcuate openings 33 and 34 provided in spaced relationship therein and on only the upper side thereof. Thus, opening 33 is adjacent the closed end 36 of the header pipe, whereas opening 34 is intermediate the opening 33 and the inlet end of the pipe. A baffle 37 is mounted in the pipe 32 adjacent opening 33 in order to equalize the rate of flow of water through the openings 33 and 34. Such baffle extends completely across the header 32 in a direction perpendicular to the plane of drawing FIGURE 1.

Disposed in a portion of the space between overdrain header 32 and the upper surface of base unit 21 is a bed 38 of loose filter sand. The sand in that portion of bed 38 which rests on the base unit 21 has a diameter sufficiently large to prevent sifting into the interstices between the stones which comprise layer 24, whereas the upper portion of bed 38 is extremely fine to provide the most effective filter action. For example, a major portion of the bed, and the one which rests on base 21, may comprise No. 16 sand. A relatively thin layer of No. 20 sand may be disposed on the upper surface of the No. 16 sand. Potassium alum or other suitable and conventional filter substance may be employed if desired. The numbers given represent U.S. Standard sieve sizes.

Referring to the showing of unit 10 in FIGURE 1, the vertical dimension between the upper surface of the sand bed and the openings 33 and 34 is designated A and is known as the "freeboard" distance. The vertical dimension between such openings and the cover 17 is designated B, and is known as the "cushion" distance.

The freeboard distance A is made just great enough that no filter sand will be discharged out through overdrain header openings 33 and 34 during backwashing of water upwardly from underdrain header 22 to overdrain header 32 for the purpose of cleaning the filter bed of contaminants. The cushion distance, designated B, is made just great enough to effect uniform water flow and pressure in the upper end of each unit 10, etc., so that the water which flows downwardly from such upper end during the filter cycle will have a relatively uniform pressure and flow distribution throughout the entire surface of the filter bed. These dimensions vary somewhat in accordance with the factors including the water pressure, particle size of the sand, etc. They are, however, particularly in the case of freeboard distance A, much smaller than in conventional filter beds because of the uniform water pressure and flow distribution effected by the base unit 21, baffle means 29 and 30, etc.

Means are provided to prevent channeling or sidewashing of water down the sides of the filter bed 38, instead of through the bed as is desired. As best shown in FIGURE 4, such means comprises a rough anti-channeling coating 39 formed on the entire inner surface of tubular wall 13 around the filter bed 38, and an annular rib or flange 40 which projects inwardly from surface 39 and is continuous throughout the entire circumference of the wall 13. Preferably, the coating 39 and rib 40 are integrally formed of No. 12 or No. 16 sand which is bonded together, and to wall 13, by means of a suitable adhesive such as the one employed to cast the stone layers 23 and 24. It is pointed out that the sand in sand bed 38 is disposed on both sides of rib 40, making it necessary that water actually pass downwardly through the sand bed instead of merely around the edges thereof.

Proceeding next to a description of the conduit, valve and pump means associated with the filter units, these comprise (FIGURES 1 and 2) a first pipe 41 connected to both of the underdrain headers 22. Pipe 41 extends upwardly to a point above cover 17, so that water may not drain from the filters when the pump is not operating. Pipe 41 connects to a suitable shut-off valve 42 which in turn connects to an anti-siphon valve 43 and thence through a pipe 44 to the swimming pool. The overdrain headers 32 connect through shut-off valves 46 and 47 to a pipe 48 the lower end of which connects through a valve 49 to a waste drain. The upper end of pipe 48 connects through a shut-off valve 51 to a cross or T connector 52. Connector 52, in turn, connects to a pipe 53 and pump 54 and thence to the swimming pool, and also connects through a valve 56 to the previously-described pipe 41 from the underdrain headers 22.

A suitable anti-siphon valve 43 is indicated in FIGURE 5 as comprising a float 57 adapted, when the valve is full of water, to engage a seat 58 and prevent outflow of water from the valve. However, when there is no water in the valve the float drops and permits inflow of air through ports 59, so that no siphoning action may occur. This insures that the filter units will always remain full of water, as is necessary in order to prevent formation of holes or channels in the filter bed when the equipment is again put in operation.

Means are provided to remove trapped air from the filter units, and comprise air lines 61 and 62 connected, respectively, to the center of cover 17 and to the center of the bottom 14 of unit 10. The latter air line, number 62, extends through the cast base layer 23. The air lines extend to the pipe 44 leading to the pool, but may be tapped by opening a valve 63 which leads to waste. Thus, air may be tapped by merely opening the valve 63 and leaving it open until all air is exhausted. When the valve 63 is closed, a very small amount of water may flow through the lines 61 and 62 to the pool.

It is emphasized that the diameter of the stones in layer 24 should be as large as possible while still providing support for the loose sand bed. Also, the diameter of the stones in layer 23 should be substantially larger than in layer 24. The result is that the voids in layers 23 and 24 are so large that they will not become clogged with the minerals present in the water. The voids are also sufficiently large to permit rapid and effective flow of water during backflushing. If the base were formed of bonded sand instead of the stones, neither of these important benefits would result. If the stones were not bonded together, they would be irregularly moved about by the rapidly-flowing water during back-flushing and would not perform their function of uniformly distributing the flow.

*Operation*

Each filter unit may be economically manufactured by merely mounting the underdrain header 22 in position and then casting the layer 23 therearound after the individual stones have been coated with the adhesive 25. The layer 24 is then cast over layer 23, following which the anti-channeling coating 39 and rib or flange 40 are adhesively applied as described above. The overdrain header may be readily mounted in cantilevered relationship, and the loose sand layer 38 may be introduced at any stage in the operation subsequent to the setting of the adhesive.

Figure 2:
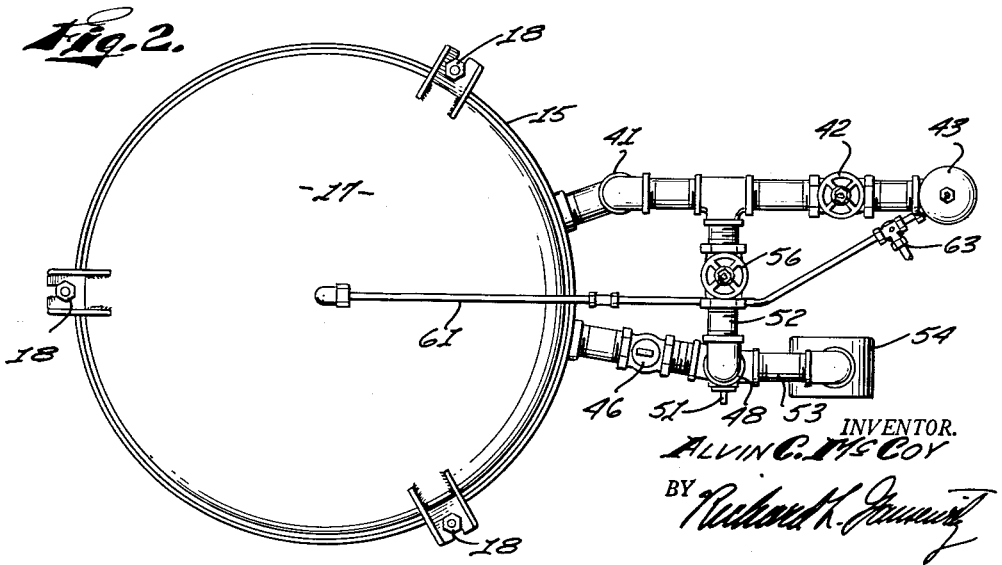
FIGURE 2 is a plan view of the showing of FIGURE 1.

The required number of filter units 10—11, etc., may then be readily mounted at the desired locations, and in either stacked or lateral relationship. Let it be assumed that the units are mounted and connected as shown in FIGURES 1 and 2, and are associated with a conventional swimming pool.

During the filter cycle, the valves 49 and 56 are closed, and valves 42, 46, 47 and 51 are open. Pump 54 is then run in a direction effecting upflow of water through pipe 53 and thence into the overdrain header 32 of each unit. Such water flows out the openings 33 and 34 in the overdrain header at a substantially equal rate, and flows upwardly into the cushion region indicated at B in FIGURE 1. The water pressure and flow in cushion region B becomes uniformly distributed throughout the diameter of the unit, following which the water flows downwardly through the loose sand bed 38, bonded layer 24, bonded layer 23, openings 28 in the underdrain header laterals, pipe 26, pipe 41 and pipe 44 back to the swimming pool. The anti-channel means 39 and 40 prevent channeling of water down the sides of the sand bed. A very excellent filter action is thus effected in the loose sand bed 38 of each unit, which finally results in the depositon of much contaminants therein.

In order to effect a backwashing or backflushing of the water to thereby clean the units of contaminants, valves 42 and 51 are closed, and valves 49 and 56 are opened. Pump 54 is then operated to effect flow of water through pipe 53, crossover 52, and pipe 41 to the underdrain header 22 of each unit. The water then flows out through the underdrain laterals 27 and the cast rock, and up through the sand bed 38 to the overdrain header 32, from whence it flows outwardly through a pipe 48 to waste. The upward flow of water through the loose sand bed causes the entire bed to be lifted or boiled into the water, so that the contaminants are thoroughly cleaned from the individual filter material particles. As previously stated, however, the freeboard distance A is made sufficient that no sand will flow outwardly through the openings 33 and 34 and thus be wasted.

It is emphasized that the combination of the baffles 29 and 30, the laterals 27 and the cast rock layers 23 and 24 cause the flow of water to be very well and equally distributed throughout the filter units. Furthermore, the water initially flows downwardly from the underdrain headers 22 and then upwardly therepast, so that there is very thorough flow and pressure distribution. The upwardly-flowing water must therefore pass through the boiling filter sand 38 in a highly uniform manner which prevents points of eruption. Because of the absence of such eruption, etc., the freeboard distance A may be made very small, as stated, without danger that filter material will be wasted. During the filter cycle, the uniform water pressure and flow prevent the filter material from being pitted or gullied, so that filtering is uniform and effective.

It is a feature of the invention that the pump 54 may be relatively small in capacity while still providing a thorough back-flushing action. This is made possible because the flow of water during the filter cycle may be relatively small, such as 3 to 5 gallons per minute, in comparison to the flow of water for backflushing, such as 10 to 12 gallons per minute. Such a volume of flow during backflushing is achieved by alternately closing the valves 46 and 47, so that each unit 10 and 11 is separately backflushed with the relatively small-capacity pump 54. In summary, the pump 54 which is adequate to handle both units during the filter cycle, when water flow is small, is also adequate to handle each separate unit during backwashing when the water flow for each unit is greater.

After completion of backflushing, the valves are returned to their initial positions so that the filter cycle may be resumed. The boiling sand then settles down onto the base, in stratified layers.

It is strongly emphasized that the cast base unit 21 (FIGURE 3a) not only provides a highly efficient distribution of flow during backflushing, but also enormously reduces the height of the supporting media upon which the loose sand 38 rests. Thus, in conventional sand filters there would be numerous rock layers, of progressively increased rock sizes, below the layer 23 illustrated herein. The resulting great reduction in the height of the base for the loose sand, and the extremely uniform distribution of water pressure and flow, mean that the height of each filter unit may be less than half that of a conventional sand filter having the same capacity. Such a size reduction, with the attendant reduction in cost and space required, make it practical to employ the present filter in conjunction with small swimming pools, so that the owners of such pools may have the benefits of improved cleaning and filtration.

To summarize and amplify upon the above description of the advantages of the cast base 21, certain of the undesirable results which would occur if the stones in the base were not bonded together will now be mentioned: (a) During the backflush cycle, the stones would rise, shift and become disuniform, thereby encouraging channeling, eruptions and other undesired results. (b) The bed or base would not produce a balanced rate of water flow per square foot, that is to say would not break up the water flow as described above. (c) The lighter stones in the bed or base would be enabled to flow up into the sand, during backflushing, and would be replaced by sand so that flow of sand to the pool could result. (d) The strength and rigidity of the underdrain header 22 would need to be increased. (e) A much greater depth of rock would be required. (f) The bonded base 21 is immune to the bomb-like effects of air mixed with the backflush water, and minimizes the possibility that balls of dirt may form in the filter.

It is to be understood that the terms "stones," "rocks," etc., include not only actual stones and rocks but also synthetic stones or rocks such as may be formed of plastic, for example. The same applies to "sand," it being understood that natural sand may be replaced by certain types of synthetic materials.

Various embodiments of the present invention, in addition to what has been illustrated and described in detail, may be employed without departing from the scope of the accompanying claims.

I claim:

1. A small and compact swimming pool filter including in combination: side, cover and bottom walls defining a closed filter chamber; an overdrain header in the upper portion of said chamber and means for selectively supplying thereto during the filter cycle the pool water to be filtered and for withdrawing therefrom during the backwash cycle the backwash water; an underdrain header extending in a shallow lower zone of said chamber and providing a plurality of orifices distributed uniformly throughout the horizontal cross section of said chamber and means for selectively supplying thereto the backwash water during the backwash cycle and withdrawing therefrom during the filter cycle the filtered pool water; a rigid cast mass of adhesively coated relatively small diameter stones substantially filling said shallow lower zone around said underdrain header in enclosing and supporting relationship therewith, the minimum diameter of said stones being of the order of about one-eighth inch and the maximum diameter of said stones being of the order of about one-fourth inch, the adhesive coating of said stones comprising a synthetic bonding resin selected from the class consisting of polyester resins and epoxy resins, said adhesive coating being used in amount sufficient only to surface coat said stones and bond same into said rigid mass while maintaining therebetween voids; and a mass of loose filter sand in said chamber having a lower stratum supported on said rigid mass of stones composed of particles larger than said voids between said coated stones and an uppermost stratum of finer sand terminating in an upper surface spaced below said overdrain header.

2. A swimming pool filter as defined in claim 1 in which said supper surface is spaced only a small freeboard distance below said overdrain header, said distance being less than the depth of said mass of loose filter sand.

3. A swimming pool filter as defined in claim 1 in which said rigid mass of adhered stones comprises a lower stratum of stones having a diameter of the order of one-fourth inch and an upper stratum of stones having a diameter of the order of one-eighth inch, the stones of each stratum being bonded together and to the stones of the other stratum by said synthetic bonding resin.

4. A swimming pool filter as defined in claim 3 in which said underdrain header is positioned exclusively in said lower stratum of stones.

5. A swimming pool filter as defined in claim 1 in which said overdrain header includes at least one large pipe having upwardly facing openings spaced below said cover wall a cushion distance slightly larger than said freeboard distance.

6. A swimming pool filter as defined in claim 1 including a rough anti-channeling coating on the inner surface of said side wall around the mass of loose filter sand, and an annular rib projecting inward as a ledge from said inner surface into said mass of loose filter sand at a level below the top thereof.

7. A swimming pool filter as defined in claim 6 in which both said coating and said annular rib comprise particles of sand bonded together by said synthetic bonding resin.

References Cited in the file of this patent

UNITED STATES PATENTS

| | | |
|---|---|---|
| 630,249 | Maignen | Aug. 1, 1899 |
| 636,447 | Paddock | Nov. 7, 1899 |
| 1,423,132 | Magrath | July 18, 1922 |
| 1,630,079 | Spalding et al. | May 24, 1927 |
| 1,805,667 | Jenks | May 19, 1931 |
| 1,910,758 | Dundore | May 23, 1933 |
| 1,962,663 | McGill | June 12, 1934 |

UNITED STATES PATENT OFFICE

CERTIFICATION OF CORRECTION

Patent No. 3,011,643 December 5, 1961

Alvin C. McCoy

It is hereby certified that error appears in the above numbered patent requiring correction and that the said Letters Patent should read as corrected below.

Column 1, line 54, for "futher" read -- further --; column 3, line 63, for '"freeboard,"' read -- "freeboard" --; column 7 line 18, for "supper" read -- upper --.

Signed and sealed this 24th day of April 1962.

(SEAL)
Attest:

ESTON G. JOHNSON
Attesting Officer

DAVID L. LADD
Commissioner of Patents